No. 845,208. PATENTED FEB. 26, 1907.
G. VAN EYCK.
STERILIZER.
APPLICATION FILED AUG. 17, 1906.

4 SHEETS—SHEET 1.

Witnesses: Inventor:
Georg van Eyck

No. 845,208. PATENTED FEB. 26, 1907.
G. VAN EYCK.
STERILIZER.
APPLICATION FILED AUG. 17, 1906.

4 SHEETS—SHEET 2.

Witnesses:
Arthur Zumpe.
William Schulz.

Inventor:
Georg van Eyck
by Hauff & Briesen Att'y

No. 845,208. PATENTED FEB. 26, 1907.
G. VAN EYCK.
STERILIZER.
APPLICATION FILED AUG. 17, 1906.

4 SHEETS—SHEET 3.

Witnesses:
Inventor:

No. 845,208. PATENTED FEB. 26, 1907.
G. VAN EYCK.
STERILIZER.
APPLICATION FILED AUG. 17, 1906.

4 SHEETS—SHEET 4.

UNITED STATES PATENT OFFICE.

GEORG VAN EYCK, OF OEFLINGEN, GERMANY.

STERILIZER.

No. 845,208.  Specification of Letters Patent.  Patented Feb. 26, 1907.

Application filed August 17, 1906. Serial No. 330,943.

*To all whom it may concern:*

Be it known that I, GEORG VAN EYCK, a citizen of Germany, residing at Oeflingen, Germany, have invented new and useful Improvements in Sterilizers, of which the following is a specification.

This invention relates to an improved apparatus for holding a series of jars while the latter are being subjected to the action of the sterilizing medium.

The apparatus is so constructed that it will securely hold the lids to the jars and that it will prevent the latter from cracking, particularly at the bottom.

Figure 1:
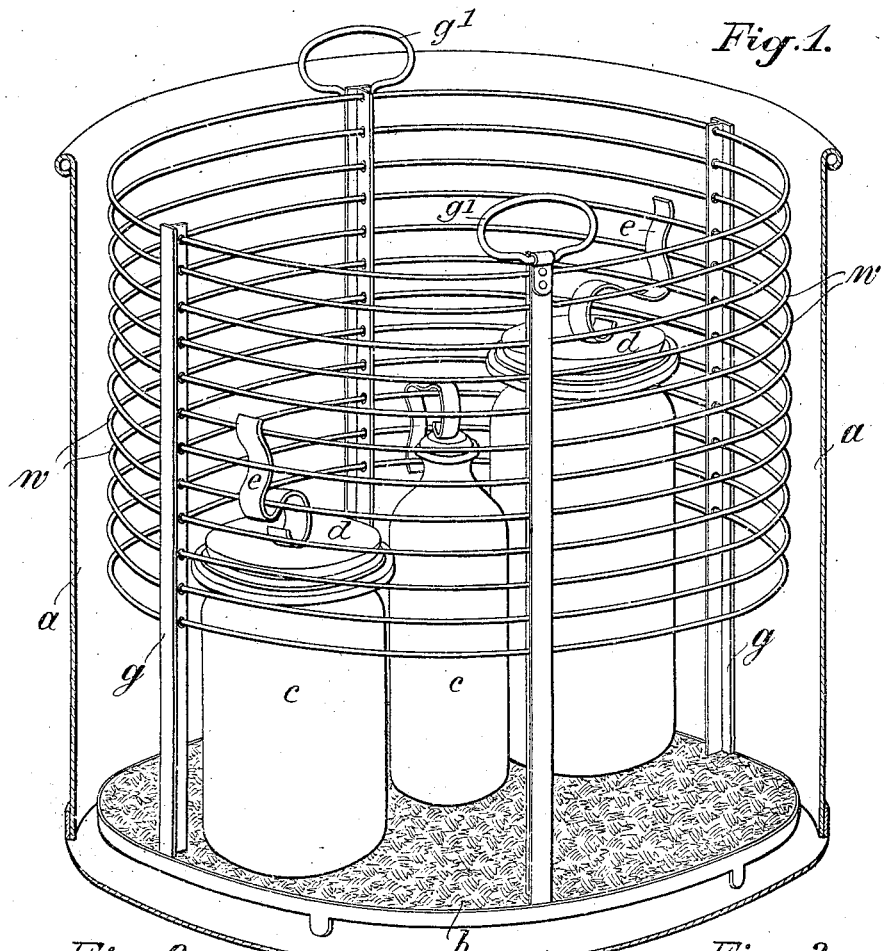
Figures 2, 3:
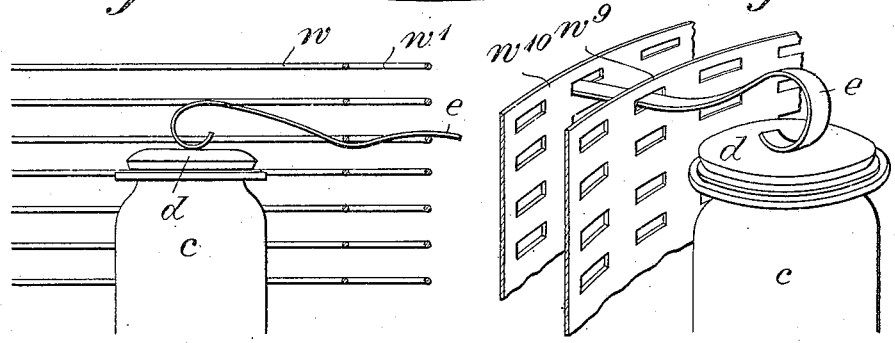
Figure 4:
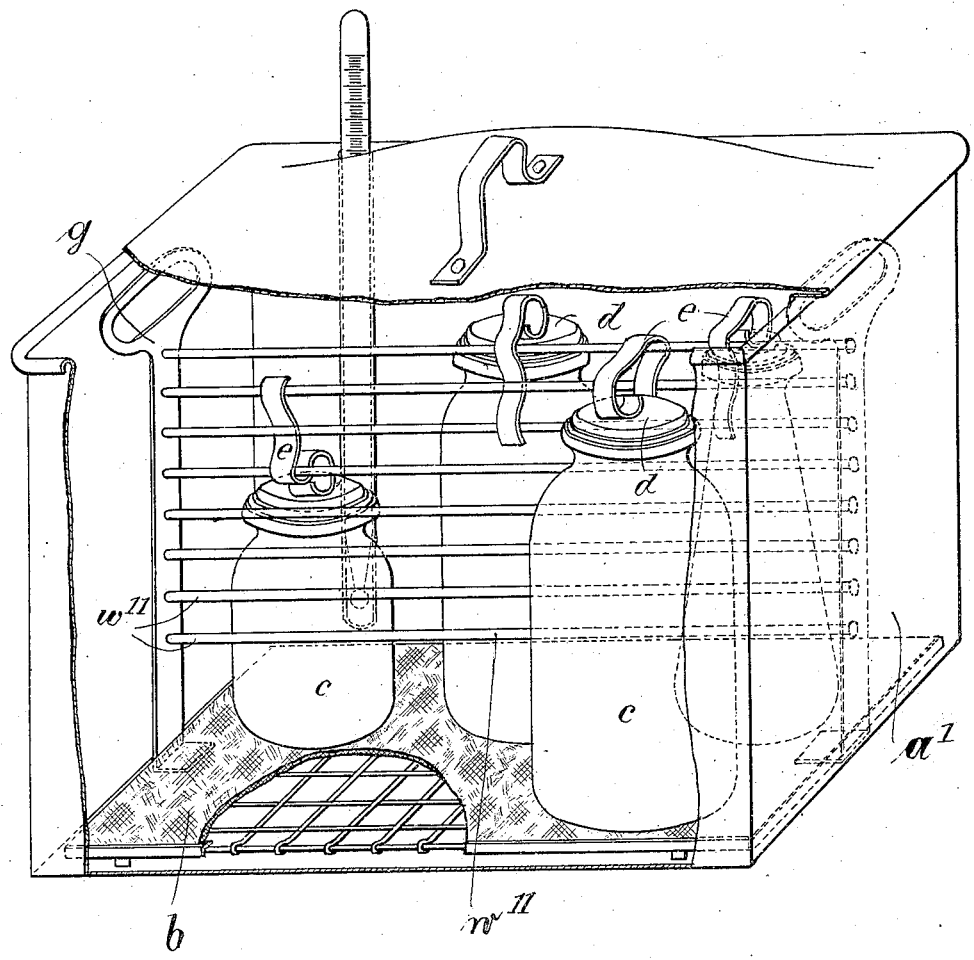
Figure 5:
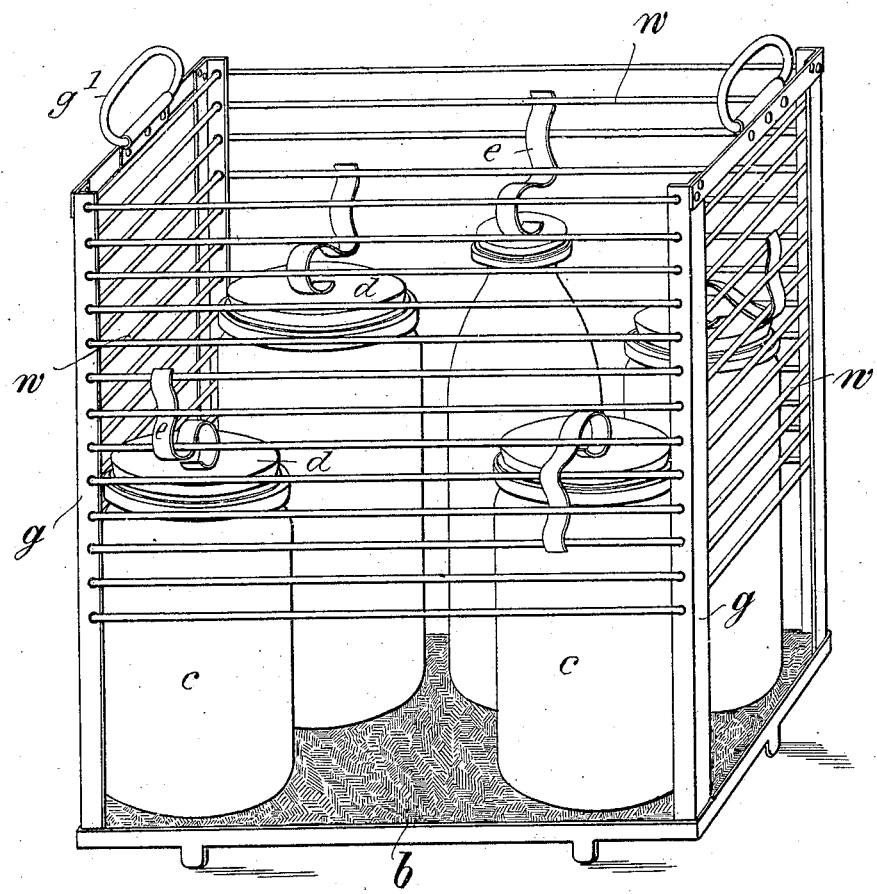
Figure 6:
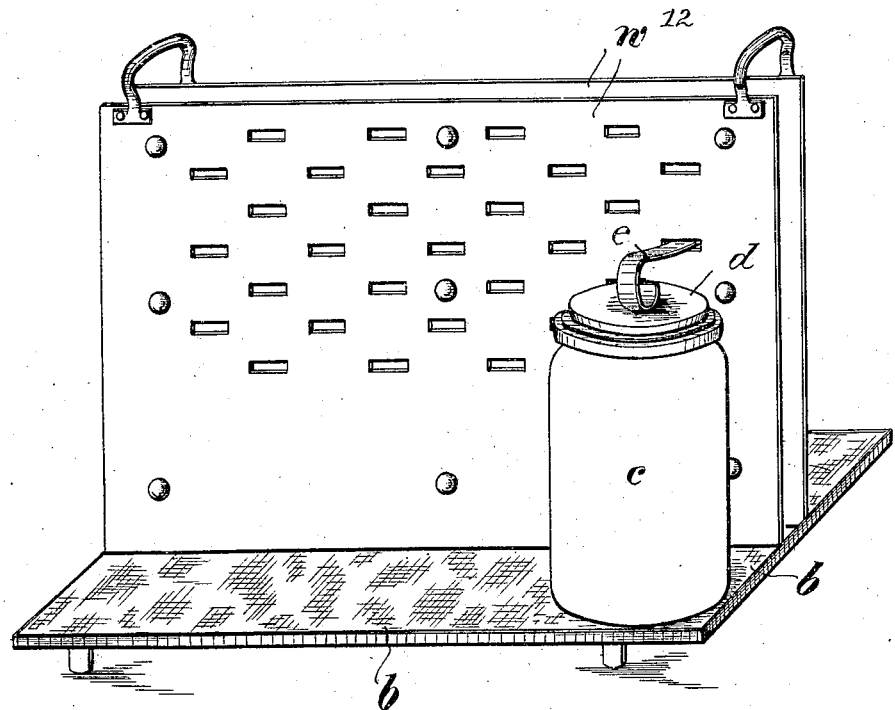

In the accompanying drawings, Figure 1 is a perspective view, partly in section, of my improved sterilizer; Fig. 2, a detail of part of a modification; Fig. 3, a detail of part of a further modification; Fig. 4, a perspective view, partly broken away, of a further modification, and Fig. 5 and 6 are perspective views of still further modifications.

Within a vessel $a$ is contained a cage or open-work frame, which is adapted to support the sterilizing-jars $c$. This frame is composed of a bottom $b$, uprights $g$, mounted thereon, and spaced parallel wires $w$, carried by the uprights. A pair of the latter may be provided with handles $g'$, by which the cage may be lifted out of vessel $a$. The bottom $b$ is composed of a poor conductor of heat, so that when the cage is lifted out of the sterilizing medium the bottom cools about as slowly as the jars and prevents the cracking of the latter owing to uneven contraction.

The covers $d$ of jars $c$ are engaged by bent springs $e$, which grasp the wires $w$, and thus lock the covers $d$ to the jars.

In Fig. 2 the cage is composed of two concentric open-work wire cylinders $w$ $w'$, that are engaged by the springs $e$.

In Fig. 3 the wire cylinders are replaced by a pair of concentric walls $w^9$ $w^{10}$, having radially-alined perforations for accommodating the springs $e$.

In Fig. 4 the wire cylinder is replaced by a transverse wire partition $w^{11}$, extending longitudinally over a square bottom $b$, which is supported within a square vessel $a'$.

In Fig. 5 a square wire cage is shown, while in Fig. 6 a perforated double partition $w^{12}$ extends longitudinally over bottom $b$.

What I claim is—

1. A sterilizer composed of a non-conducting bottom, and an open-work frame extending upward from said bottom, substantially as specified.

2. A sterilizer composed of a non-conducting bottom, an open-work frame extending upward from said bottom, and a spring engaging said frame and adapted to engage the cover of a sterilizing-jar, substantially as specified.

Signed by me at Freiburg, Baden, this 4th day of August, 1906.

GEORG VAN EYCK.

Witnesses:
 ADOLF BENSEL,
 GERTRUDE E. LIEFELD.